N. V. HAUGHTON.
FAUCET.
APPLICATION FILED OCT. 29, 1915.
1,222,865.
Patented Apr. 17, 1917.
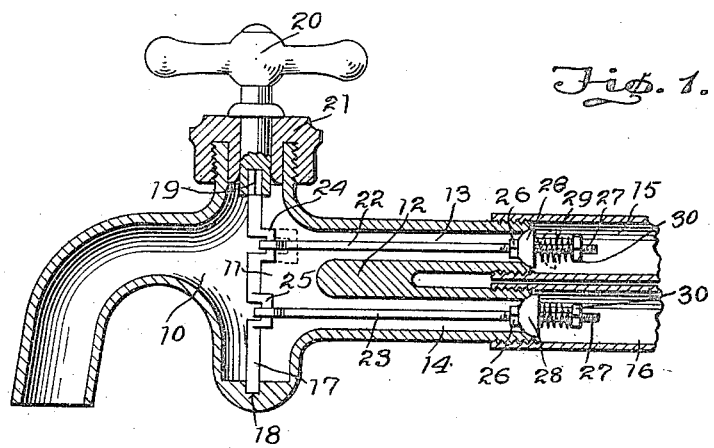
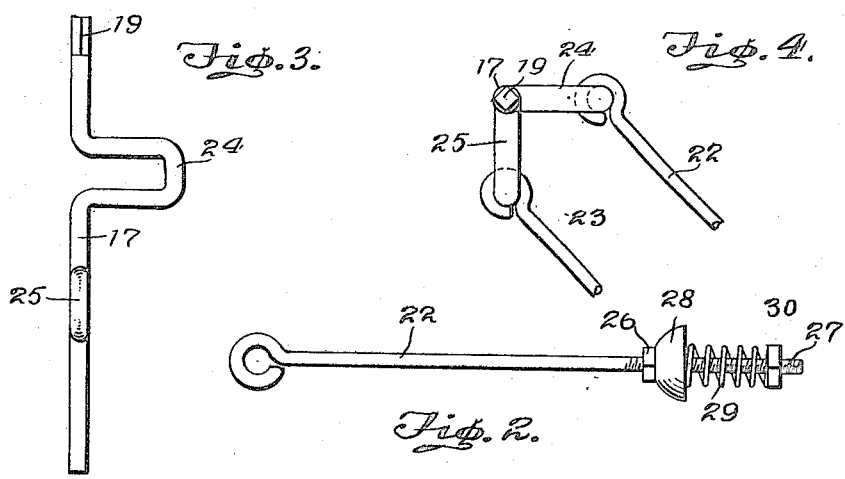
INVENTOR
Nathaniel V. Haughton,
WITNESSES
Edw. S. Hall.
BY Richard Owen,
ATTORNEY

UNITED STATES PATENT OFFICE.

NATHANIEL V. HAUGHTON, OF ALAMEDA, CALIFORNIA, ASSIGNOR OF ONE-HALF TO M. T. GARDINER, OF SAN FRANCISCO, CALIFORNIA.

FAUCET.

1,222,865.   Specification of Letters Patent.   Patented Apr. 17, 1917.

Application filed October 29, 1915. Serial No. 58,656.

*To all whom it may concern:*

Be it known that I, NATHANIEL V. HAUGHTON, a citizen of the United States, residing at Alameda, in the county of Alameda and State of California, have invented certain new and useful Improvements in Faucets, of which the following is a specification.

This invention relates to an improved faucet and the principal object of the invention is to provide a mixing faucet having improved valves for the inlets of the faucet so that the inlets may be tightly closed without the rubber valves or standards being unduly worn.

Another object of the invention is to so construct the actuating means for the valves that either hot or cold water alone may be permitted to pass through the faucet or a desired mixture of the hot and cold water permitted to pass therethrough.

Another object of the invention is to so construct the faucet that it will be very simple in construction and at the same time very effective in operation.

This invention is illustrated in the accompanying drawings, wherein:—

Figure 1 is a view showing the improved faucet in longitudinal section with both valves closed.

Fig. 2 is an enlarged plan view of one of the valves shown in Fig. 1.

Fig. 3 is an enlarged view of the crank shaft which is connected with the valve stems as shown in Fig. 1.

Fig. 4 is a view showing the crank shaft of Fig. 3 in top plan with the end portions of the valve stems connected with the shaft, the position of the crank shaft and valve stems when the valves are in a closed position being indicated by dotted lines.

This spigot or faucet 10 is provided with a mixing chamber 11 from which extends the neck 12 having the two passageways 13 and 14, the passage 13 communicating with the hot water pipe 15 and the passage 14 communicating with the cold water pipe 16. It of course is understood that it is immaterial whether the pipe 15 is the hot water pipe or the pipe 16 the cold water pipe. When one of the valves is opened and one closed either hot or cold water alone will flow through the faucet but when the valves are both opened hot and cold water will both flow into the mixing chamber 11 and pass out through the faucet at a temperature depending upon the relative amount the two valves are opened. It should be further noted that with this structure the water can be started at cold and gradually increased in temperature until it is hot or if desired the hot water can be turned on first and the temperature gradually reduced instead of increased until the water is entirely cold.

Within the mixing chamber 11 there is positioned a crank shaft 17 which has its lower end rotatably mounted in the socket or bearing 18 and has its upper end portion 19 squared. This squared end 19 is provided so that the crank shaft may be engaged by the handle 20 carried by the packing collar 21 and the crank shaft rotated in order to move the valve stems 22 and 23 which have their inner ends rotatably mounted upon the offsets 24 and 25 of the crank shaft. It should be noted that these offsets 24 and 25 extend at substantially right angles to each other and the normal adjustment is such that rotation of the crank shaft will cause the valve stems 22 and 23 to move in opposite directions thereby moving one valve to a closed position while the second valve is moving toward an open position.

Each of the valve stems is provided with an abutment 26 which is screwed upon the threaded end 27 thereof so that the position of the abutment on the valve stem may be regulated. The head 28 which may be formed of rubber, leather or any other suitable material is slidably mounted on the threaded end portion of the valve stem and is yieldably held in engagement with the abutment 26 by means of the springs 29 positioned between the valve head and the abutment nut 30. By adjusting the abutment nut along the valve stem the tension of the spring can be regulated and thus the valve head held in engagement with the inlet neck with sufficient tension to prevent passage of water through the same. It should be noted, however, that the spring will have sufficient give to permit the stems to slide through the valve head when excessive pressure is applied to the head thus preventing the head from being cut or torn loose. The operation of this faucet is as follows.

When the faucet is in use it is mounted as shown in Fig. 1 and under normal circumstances the crank shaft will be turned to the position shown so that both of the valves will be closed. When it is desired to cause either hot or cold water to flow through the faucet, the crank shaft will be turned in the proper direction to move the desired valve away from the inlet passageway. If for instance, the stem 22 is moved away the hot water will flow through the faucet. When the crank shaft is turned to permit the stem 22 to move to the open position it will first draw the stem 23 inwardly at the same time that the stem 22 is moving outwardly and then move the stem 23 outwardly. Of course, if only hot water is desired the crank shaft will not be turned a sufficient distance to release the valve of stem 23 but if it is desired to have warm water the shaft will be rotated until the cold water valve is open and the hot water valve partly closed. By turning the crank shaft to the proper point the two valves can be left open the desired amount and thus the proper temperature of water obtained. Of course if cold water is wanted instead of hot water the crank shaft will be turned in the proper direction to open the cold water valve instead of the hot water valve and by continuous rotation the temperature of the water can be increased instead of decreased.

What is claimed is:—

1. A faucet provided with a mixing chamber and having upper and lower inlet passageways communicating with the mixing chamber in superposed relation and provided with valve seats, a crank shaft rotatably mounted in the mixing chamber and having offsets extending at substantially right angles to each other, valve stems having their inner end portions rotatably mounted upon the offsets of the crank shaft and permitting complete rotation of the crank shaft, the valve stems extending through the passageways of the neck beyond the valve seat, valve heads slidably mounted upon the outer end portions of said valve stems, means for limiting the inward movement of said valve heads along said stems, and resilient means engaging said valve heads to yieldably hold the valve heads in engagement with the means for limiting their inward movement, a complete rotation of the crank shaft moving the valve stems first to open one inlet passageway and then the second and then move the valve stems to close the first passageway and then the second.

2. A faucet provided with a mixing chamber and having upper and lower inlets communicating therewith, valve stems extending through the inlets, valve heads slidably mounted upon the outer end portions of the valve stems, and limited in their inward movement along the valve stems, resilient means mounted upon the valve stems and engaging the valve heads to yieldably hold the heads in a set position, an actuating shaft rotatably mounted in the mixing chamber and provided with crank arms extending at substantially right angles to each other, the inner end portions of the valve stems being rotatably mounted upon the crank arms for permitting complete rotation of the actuating shaft, a complete rotation of the actuating shaft moving the valve stems to move one to a position releasing the valve from a closed position with the second valve in a closed position and then moving the second stem to release its valve with the first valve open, the first valve being then brought to a closed position with the second open and the second then brought to a closed position with the first closed.

In testimony whereof I affix my signature in presence of two witnesses.

NATHANIEL V. HAUGHTON.

Witnesses:
 ILAH M. HAUGHTON,
 IONE L. HAUGHTON.